Nov. 18, 1958 G. OBOLENSKY 2,861,220

PUNCHED CARD AND TAPE READ OUT SYSTEM

Filed Sept. 19, 1956

INVENTOR
GUY OBOLENSKY

BY
I. Jordan Kunik
ATTORNEY

United States Patent Office 2,861,220 Patented Nov. 18, 1958

2,861,220

PUNCHED CARD AND TAPE READ OUT SYSTEM

Guy Obolensky, Yonkers, N. Y., assignor of ten percent to Jordan Kunik, New York, N. Y.

Application September 19, 1956, Serial No. 610,852

7 Claims. (Cl. 315—163)

This invention relates to improved punched card and punched tape read out and memory devices.

In the operation of electronic computing, accounting, typesetting, addressing machines and the like, information is impressed upon cards or tape in the form of perforations arranged in a variety of patterns on symmetrical matrixes in accordance with various coding systems. As the card or the tape positioned in or is fed through a suitable read out apparatus, the punched holes are read and the information therefrom is transmitted to a memory storage system such as a magnetic drum or a magnetic tape and thence to printing or other types of recording media. The use of the storage system is necessary in order to permit continuous read out or processing of information by the electronic computing, accounting or printing machines.

In conventional electronic data processing machines, the punched holes are sensed either mechanically or photoelectronically. In one system spring biased electrode fingers or the like on one side of the card or tape are adapted to register the occurrence of punched holes by making contact with corresponding stationary electrodes on the opposite side of the card or tape. This system is confined to comparatively slow operation, due to the resonance characteristics of the spring biased electrodes which can sense only a low maximum of succeeding punched holes in a given unit of time. Also the electrodes are subject to failures due to erosion of their contacting surfaces.

Another conventional data processing system utilizes a bank of photoelectric cells and associated circuitry which is adapted to distinguish between the absence or presence of particular holes according as beams of light are blocked by solid areas, or pass through holes in the card or tape. The photoelectric cell system with its associated circuitry is comparatively expensive and occupies an inconvenient amount of space.

Both the aforementioned photoelectric cell system and the mechanical sensing systems require an intermediate memory system comprising a plurality of vacuum tubes, relays or the like, equalling the number of photocells or contacts. From these tubes or relays is derived the information to be transmitted to the memory storage system.

In order to obviate the foregoing disadvantages, I provide an improved punched card or tape read out and direct memory system which comprises the utilization of an ion stream circuit for sensing the absence or presence of a punched hole in the card or tape, the presence of the punched hole permitting the circuit to produce an electrical impulse which is transmitted to a corresponding neon tube for providing a visual signal and memory storage for the detection of said punched hole. The size and distribution of the punched hole matrix on the card or tape will determine the number and array of ion stream circuits, as well as the number and array of the corresponding neon tubes.

Not only is a considerable saving in cost realized in dispensing with photoelectric cells and corresponding light sources therefor with commensurate saving in space, but my system also dispenses with the necessity for involved and expensive intermediate circuitry for the memory components.

The means for producing the ion stream circuit comprises a needle-like generator electrode whose point is surrounded by a concentric guard ring and a spaced apart sensing electrode. The needle electrode and the guard ring in combination generate an ion cloud which streams across the air gap to the sensing electrode when no dielectric is interposed between the two electrodes. Under such conditions a circuit is established between the two electrodes which can be adapted to produce a suitable electrical signal. The interposition of a dielectric between the two electrodes will prevent the completion of a circuit between the two electrodes thereby preventing the creation of a signal. Thus, the presence of a punched hole in a dielectric card or tape positioned between the electrodes will be sensed by the closing of the ion stream circuit to produce a useful electrical signal, whereas the absence of a punched hole will prevent the production of such a signal.

The ion stream circuit described herein can also be applied, amongst other things, to instruments for detecting the presence or absence of dielectrics in various air gaps.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawing, in which.

Figure 1:
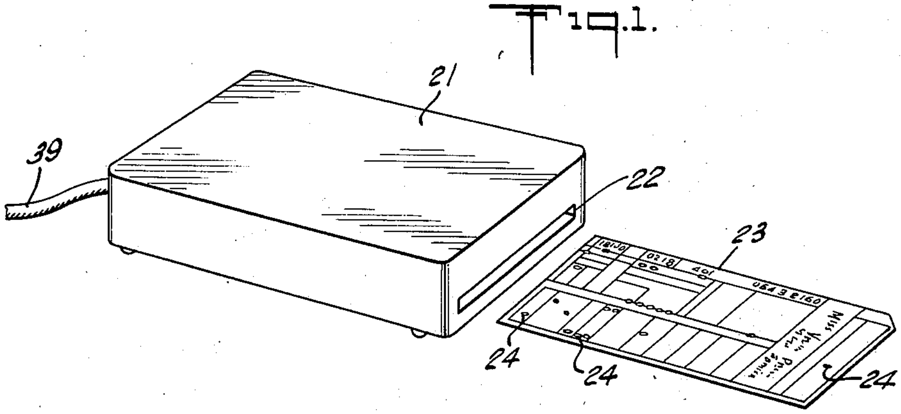
Figure 1 is a perspective view of the apparatus of the present invention, showing also a typical punch card about to be introduced into the apparatus.

Referring now to the drawings in detail, the apparatus of the present invention may be enclosed in any suitable container 21 or upon any suitable support as is typically illustrated in Fig. 1. Said container or support has a longitudinal recess 22 for admitting a typical punched card 23 as shown in Fig. 1, said punched card having information stored thereon in the form of holes 24 in accordance with a suitable coding system.

Figure 2:
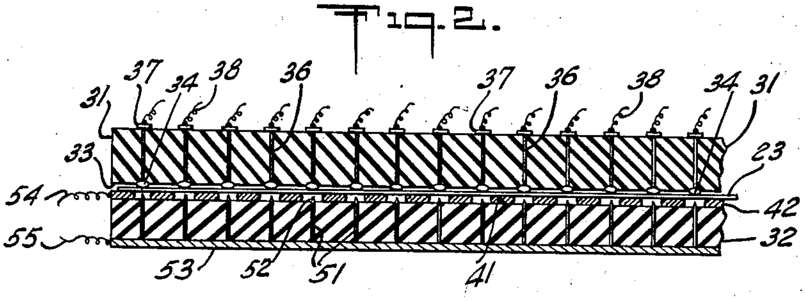
Fig. 2 is an enlarged section view taken longitudinally along the apparatus of Fig. 1, and showing a punched card inserted into the apparatus.

The essential components of the read out apparatus are shown in cross section in Fig. 2, and they comprise a pair of spaced apart, substantially parallel blocks 31 and 32, having a generally rectangular shape conforming to the contours of punched card 23. Blocks 31 and 32 are made of a suitable insulating material such as Bakelite, wood, plastics or the like. Embedded in the lower surface 33 of upper block 31 is a plurality of blunt faced sensing electrodes 34 distributed in a symmetrical array which forms a matrix that correspond with the totality of all holes 24 that may be punched through card 23. The bottom surfaces of electrodes 34 may be somewhat convex and they protrude slightly from the bottom surface 33 of block 31.

Electrodes 34 have respective conductive stems 36 extending upwardly through block 31 and terminating in lug 37 (Figs. 2 and 3) to which lead lines 38 are connected, said lead lines in turn being connected by way of cable 39 (Fig. 1) to electrical circuits which will be described hereinbelow.

Positioned on the top surface 41 of lower block 32 and substantially coextensive therewith is a ground plate 42. Ground plate 42 has a plurality of apertures 43 that are bounded by circular guard rings 44 and are arranged in a symmetrical array corresponding in number and position with electrodes 31 opposite which they are positioned. The inner peripheries of rings 44 are smooth and may preferably have convex surfaces.

Embedded in the dielectric material of lower block 32, is a plurality of vertically extending needle-like generator electrodes 51 whose upper sharply pointed ends 52 terminate slightly above the top surface 41 of block 32 and extend substantially centrally into corresponding apertures 43 in ground plate 42 to a position intermediate the top and bottom surfaces of said ground plate. Mounted substantially coextensive with the bottom of lower block 32 is a collector terminal plate 53 with which the lower ends of all the electrodes 51 make electrical connection. Ground plate 42 and terminal plate 53 have lead lines 54 and 55, respectively, with which said plates may be connected by way of cable 39 to electrical circuits which will be described hereinbelow.

Figure 3:
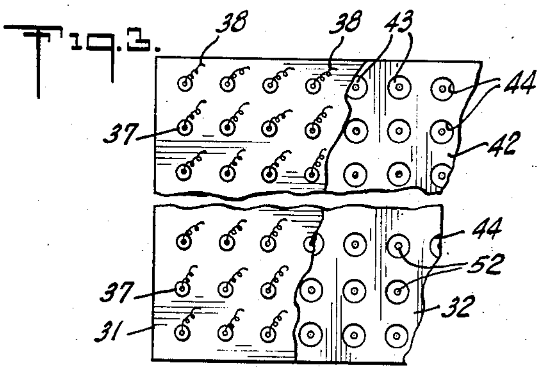
Fig. 3 is a top fragmentary view of the apparatus shown in Fig. 2 and partly broken away to the level below the card illustrated therein.

As will be observed from Figs. 2 and 3, electrodes 34, 51 and guard rings 44 are arranged in coacting groups in a symmetrical matrix, which corresponds with the matrix of the punched card which is to be read by the apparatus.

Figure 5:
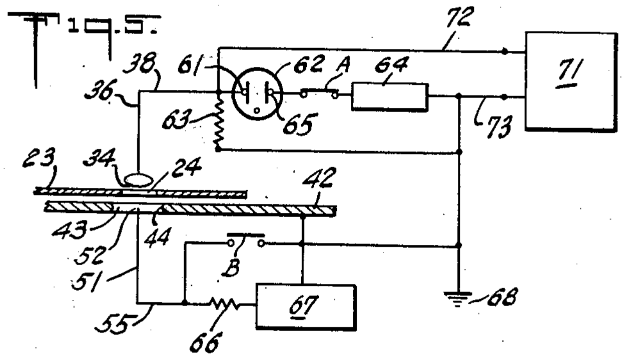
Fig. 5 is a schematic circuit diagram of the read out system in conjunction with an exploded view of one of the groups of elements of the apparatus shown in Figs. 2 and 3.

The basic operative circuitry of the apparatus and system herein is illustrated schematically in Fig. 5 where each upper electrode 34 is connected by way of lead line 38 to one electrode 61 of a corresponding recording neon tube 62. A common terminal for both electrode 34 and neon tube electrode 61 is connected by way of dropping resistor 63 to one terminal of a neon tube power supply 64, the other terminal of which is connected to the second electrode 65 in neon tube 61. Lower electrode 51 is connected by way of lead line 55 to one end of dropping resistor 66, the other end of which is connected to one high voltage ionization power supply 67, the other terminal of which is connected to ground 68. Suitable connections to ground 68 are also made with ground plate 42, neon power supply 64, and neon tube 62 through resistor 63. The on or off condition of neon tube 62 may be transmitted to any one of several suitable read out systems 71 known in the art, which is connected to electrodes 61 and 65 of neon tube 62 by way of lead lines 72 and 73, respectively.

Figure 4:
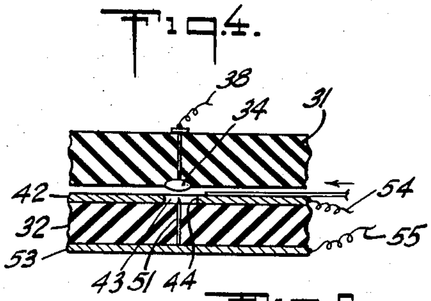
Fig. 4 is a fragmentary section view similar to Fig. 2, showing another embodiment of the present invention.
Figure 6:
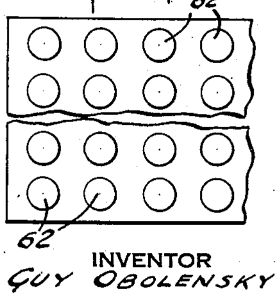
Fig. 6 is a fragmentary view of a visual read out matrix comprising a plurality of neon tubes.

Although the circuitry for one neon tube associated with one set of electrodes is illustrated in Fig. 4, it is understood that a battery of neon tubes in matrix formation comparable to the matrix of sets of electrodes is massed on an instrument panel for visual read out means, as shown in the fragmental illustration of Fig. 6. Each neon tube represents its own set of electrodes and each is connected to the neon power supply 64.

All of the needle electrodes 51, however, are electrically connected to each other by way of common terminal plate 53 which in turn is connected by way of resistor 66 to ionization power supply 67.

The system and apparatus of the present invention takes cognizance of the fact that a highly electrically stressed object in a gaseous atmosphere is normally surrounded by an ion cloud. Use is made of this phenomenon by providing a needle-like electrode 51, the finely sharpened point 52 of which is surrounded substantially equidistantly by the smooth inner periphery of a circular guard ring 44, and between said two elements an ion cloud is generated and maintained due to the highly stressed potential gradient established between these two elements by the ionization power supply 67. Each electrode point 52 and its corresponding guard ring 44 in combination serve as an ion generator.

Located above each ion generator and spaced apart therefrom is a sensing electrode 34. The instantaneous polar condition and the electrical potential of electrode 34 will be determined by the presence or absence of a solid dielectric that may be interposed between itself and the ion generator. When no solid dielectric is interposed therebetween as would obtain when a hole 24 is being sensed in a punched card 23, an ion stream will flow from the ion generator directly to sensing electrode 34 through the punched hole, and the potential of this sensing electrode becomes the same as that of the needle electrode 51 in the ion generator. This potential is of the correct polarity to cause neon tube 61 to be ignited.

When, however, a solid dielectric is interposed between the ion generator and electrode 34, as is the case when there is no hole present in card 23, a charge is sprayed upon the lower surface of the solid dielectric by the ion cloud, and causes the attraction of an opposite charge to the upper surface of the card. This charge on the upper surface of the card is transferred to sensing electrode 34 which is of the opposite polarity from that required to ignite the neon tube and consequently, the tube remains unfired. Thus, these static electrical phenomena operate as a safety factor in making the system extremely stable and in ensuring its reliability.

Blocks 31 and 32 are spaced apart just sufficiently to slidably admit punched card 23 between them whereby the surfaces of said card are in light contact with the faces of electrodes 34 on one side and with ground plate 42 on the other. Suitable rollers or other means (not shown) may be provided to facilitate the transit of card 23 between blocks 31 and 32.

Included in the schematic circuit of Fig. 5 are switches A and B which may be provided to control the operation of the apparatus and system provided herein.

Normally closed switch A is located between the neon power supply 64 and the common terminal (not shown) to which is connected one electrode 65 of each neon tube 62 in the read out matrix. Switch A is normally closed whereby each of the neon tubes 62 is potentially ignitable when a signal is received from the corresponding upper electrode 34 to which said neon tube is connected. This normally closed switch A can be designated as the "ready" switch. When switch A is momentarily opened, each neon tube which has been excited will become extinguished because the current is broken. This operation of momentarily opening switch A clears the matrix of recorded signals in order to render said matrix ready for the reception of fresh information to be sensed from new cards or succeeding portions of punched tape. Switch A may be actuated by suitable manual, mechanical or electrical coding means indicating the completion of a matrix registering sequence.

Normally open switch B is in the lead from the ground plane terminal of the ionization power supply to the lower electrode matrix by way of common terminal plate 53. Switch B serves to ground needle electrodes 51 in order to eliminate their charge. Switch B may be designated as a "hold" switch since that the needle electrodes 51 remain charged when said switch is open. If it should be desired to retain the particular read out pattern that has been registered on the neon tube matrix, the closing of switch B, which discharges needle electrodes 51, will prevent further information from being sensed by the matrix of upper electrodes 34 for registration on the neon tube matrix.

In this manner a visual or electrical read out, as desired, can be maintained for any desired length of time until another recording sequence is to be initiated, at which time switch A is opened momentarily to clear or extinguish the lighted pattern on the neon tube matrix. Thereafter, switch A is closed again to make the neon tube matrix ready for the reception of fresh information transmitted by the matrix of electrodes 34. The opening of switch B reactivates the matrix of ion generators constituted by paired needle electrodes 51 and guard rings 44 whereby respective sensing electrodes 34 may become energized according as the ion streams are permitted to pass from said generators to said sensing electrodes when holes appear in the punched card or tape. Suitable means may be provided to coordinate the operation of switches A and B.

The apparatus and system embodied in Figs. 3 and 4 are adapted to produce a simultaneous read out of all the holes 24 that have been punched in card 23 while the latter is motionless between blocks 31 and 32. In some systems it is desired to produce read outs on successive discrete rows of punched holes in cards or elongated tape. For such systems, the apparatus shown in Figs. 2 and 3 may be modified by eliminating all but one transverse row of ion generators and corresponding sensing electrodes as illustrated in Fig. 4. The number of pairs of electrodes in said embodiment will correspond to the number of possible holes that may be punched transversely in the card or tape 81 that moves past said electrodes. Suitable means well known in the art may be devised for taking successive readings of each transverse row of punched holes as the card or tape moves through the apparatus. In the embodiment of Fig. 4, the same basic circuitry shown in Fig. 5 may be utilized therewith.

Although the ion stream sensing system described herein may be provided with conventional read out circuitry, known in the art, I prefer to employ neon tubes for the read out system. The advantage of utilizing neon tubes 62 instead of ordinary vacuum tubes or other nonlinear elements is that said neon tubes perform the triple function of directly responding to the electrostatic potentials imposed upon their associated sensing electrodes 34, of producing a visual indication of said electrostatic states, and serving as a sustainable memory system because they can remain ignited once their ionization has been initiated. Since these neon tubes do not require as much associated circuitry as other types of elements considerable economies in original cost and maintenance as well as in saving of space are realized by the use of these tubes which are particularly suitable for coordination with the ion stream system for sensing the holes in punched cards or tape.

The ion generating-sensing electrode system herein may be utilized in connection with various processing and testing equipment which require "go and no-go" detection of the presence or absence of solid dielectrics in a gaseous atmosphere gap. In such embodiments as in the punched hole read out system, one or any number of paired ion generators and sensing electrodes bounding said gap or gaps may be utilized as circumstances require.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. An electrical system comprising a needle electrode having a sharp point, a guard ring concentrically surrounding said point, a sensing electrode spaced apart from said needle electrode and forming a gap therebetween, a power supply connected to said needle electrode and said guard ring to produce an ion cloud, said ion cloud forming an electrical circuit between said electrodes, and a dielectric information sheet having solid and apertured areas therein, said sheet being adapted to be inserted into said gap, the sides of said sheet being subjected by said ion cloud to static charges when a solid portion thereof is in the region between said electrodes thereby interrupting the circuit therebetween, said circuit being closed when an aperture appears in said sheet between said electrodes.

2. An electrical system comprising a needle electrode having a sharp point, a guard ring concentrically surrounding said point, a sensing electrode spaced apart from said needle electrode and forming a gap therebetween, a power supply connected to said needle electrode and said guard ring to produce an ion cloud, said ion cloud forming an electrical circuit between said electrodes, a dielectric information sheet having solid and apertured areas therein, said sheet being adapted to be inserted into said gap, the sides of said sheet being subjected by said ion cloud to static charges when a solid portion thereof is in the region between said electrodes thereby interrupting the circuit therebetween, said circuit being closed when an aperture appears in said sheet between said electrodes, and a neon tube connected to said sensing electrode and adapted to ignite when an electrical circuit is formed between said needle electrode and said sensing electrode.

3. Apparatus for sensing punched holes in a dielectric information medium such as card or tape, comprising a plurality of first electrodes arranged in a matrix conforming to that of the medium, a plurality of guard rings, each of said rings concentrically surrounding a corresponding first electrode, a plurality of second electrodes equal in number and in the same array as said first electrodes, said second electrodes being spaced apart from said first electrodes and forming corresponding gaps between associated first and second electrodes, a power supply connected to said first electrodes and guard rings, said first electrodes and guard ring producing ion streams across said gaps to corresponding second electrodes, and a dielectric medium having solid and apertured areas therein and adapted to be inserted into said gaps, the sides of said medium being subjected by said ion streams to static charges in the regions of solid portions thereof that lie between corresponding associated first and second electrodes thereby interrupting the circuit therebetween, the circuits between selected associated first and second electrodes being closed when apertures appear in said medium between said selected associated first and second electrodes.

4. Apparatus according to claim 3, and further comprising a plurality of neon tubes, each of said tubes being connected electrically to a corresponding second electrode and adapted to ignite when an electrical circuit is formed between said second electrode and its corresponding first electrode.

5. Apparatus according to claim 4, and further comprising a ground element to which each of said guard rings is connected, a normally closed switch forming a circuit between all of said neon tubes and said ground element, and a normally open switch forming a circuit between all of said first electrodes and said ground element.

6. Apparatus according to claim 4 wherein said first electrodes each have sharp points around which the guard rings are positioned, and said second electrodes each have blunt faces positioned opposite said sharp points.

7. Apparatus according to claim 4, and further comprising an electrically conductive plate, a plurality of apertures bored in said plate, each of said apertures forming the guard rings surrounding said electrodes, and a ground element to which said plate is connected.

References Cited in the file of this patent

UNITED STATES PATENTS

| | | |
|---|---|---|
| 2,021,010 | Jenkins | Nov. 12, 1935 |
| 2,431,381 | Elliot | Nov. 25, 1947 |
| 2,581,984 | Toulon | Jan. 8, 1952 |